United States Patent [19]

Cooper

[11] 4,222,913
[45] Sep. 16, 1980

[54] STRETCH PALLET WRAP FILM MATERIALS

[75] Inventor: Barry A. Cooper, Wayzata, Minn.

[73] Assignee: Bemis Company, Inc., Minneapolis, Minn.

[21] Appl. No.: 961,293

[22] Filed: Nov. 16, 1978

Related U.S. Application Data

[63] Continuation of Ser. No. 883,411, Mar. 6, 1978, abandoned.

[51] Int. Cl.$^2$ .............................................. C08L 23/16
[52] U.S. Cl. .............................. 260/23 AR; 260/23 H; 525/222; 525/227; 525/240
[58] Field of Search ............ 260/23 H, 23 AR, 897 B; 525/222, 227, 240

[56] References Cited

U.S. PATENT DOCUMENTS

| | | | |
|---|---|---|---|
| 3,433,573 | 3/1969 | Holladay et al. | 260/897 B |
| 3,896,069 | 7/1975 | Kosaka et al. | 260/897 B |
| 3,932,563 | 1/1976 | Argurio et al. | 260/897 B |
| 3,952,073 | 4/1976 | Isaka et al. | 260/897 B |
| 4,073,782 | 2/1978 | Kishi et al. | 260/23 H |
| 4,116,914 | 9/1978 | Coran et al. | 525/222 |

*Primary Examiner*—Ronald W. Griffin
*Attorney, Agent, or Firm*—Senniger, Powers, Leavitt and Roedel

[57] ABSTRACT

Improved stretch pallet wrap films are prepared from blend compositions comprising from approximately 79% to 98% by weight of a high molecular weight ethylene-vinyl acetate copolymer, from approximately 1% to 18% by weight of a polypropylene copolymer and from approximately 0.3% to 5% by weight of a tackifier agent which may be a glycerol mono fatty acid, a sorbitan mono fatty acid, castor oil or expoxidized soya, with the ethylene-vinyl acetate copolymer having a vinyl acetate comonomer content of between approximately 8% and 20% and the polypropylene copolymer having a refractive index substantially similar to that of the ethylene-vinyl acetate copolymer. Such films exhibit improved properties for the stretch wrapping of palletized loads of boxes, bags and the like.

22 Claims, No Drawings

STRETCH PALLET WRAP FILM MATERIALS

This is a continuation, of application Ser. No. 883,411, filed Mar. 6, 1978, now abandoned.

BACKGROUND OF THE INVENTION

This invention relates to polymeric packaging films and more particularly to polymeric films having properties particularly useful for the stretch wrapping of palletized loads of boxes, bags and the like.

It is well known in the art to use thin polymeric films for stretch wrapping of pallets which films are made of polyvinyl chloride, polyethylene and ethylene-vinyl acetate copolymers.

The required properties of a good stretch pallet wrap film are as follows:

1. High machine direction ultimate tensile strength.
2. High machine direction ultimate elongation.
3. High modulus of elasticity.
4. High tear resistance in the transverse direction.
5. High puncture resistance
6. Good optics—clarity and gloss.
7. Good layer to layer cohesion.
8. Low stress relaxation with time.
9. High resistance to transverse tear when under machine direction tension.
10. Producible in thin gauges.
11. Low specific gravity and thus high yield in area per pound.

Polyvinyl chloride film is a popular stretch pallet wrap material but is deficient in having low ultimate tensile strength and elongation, poor puncture resistance, and a high specific gravity yielding a low area per pound. Polyvinyl chloride film is particularly poor in stress relaxation in that it loses 70% of its initial tension after 16 hours when stretched to 30% elongation.

Conventional low density polyethylene is less than an ideal candidate for stretch pallet wrapping because of its relatively low machine direction ultimate tensile and elongation, poor puncture resistance, poor resistance to transverse tear under machine direction tension, and low layer to layer tackiness. Also, low density polyethylene generally cannot be produced in thin gauges particularly from resins having reasonable strength and toughness properties.

While ethylene-vinyl acetate copolymers are potential candidates for stretch pallet wrap film materials, those having less than about 8% vinyl acetate content are similar to and have most of the deficiencies of low density polyethylene. Further, those ethylene-vinyl acetate copolymers having a vinyl acetate content of more than about 8% are normally of lower molecular weight and thus lack the physical properties in terms of the ultimate tensile, tear resistance, impact resistance and stress relaxation properties required.

Illustrative prior art patents relating to this art include U.S. Pat. Nos. 3,433,573 and 3,932,563.

SUMMARY OF THE INVENTION

Among the objects of the present invention may be noted the provision of blend compositions suitable for processing into improved stretch pallet wrap film materials; the provision of stretch pallet wrap film materials having improved properties in terms of ultimate tensile strength, elongation, stretch relaxation, permanent deformation, tear strength, clarity and cohesive tackiness which render them particularly useful for the stretch wrapping of palletized loads of boxes, bags and the like; and the provision of such stretch pallet wrap film materials which are economical to produce. Other objects and features will be in part apparent and in part pointed out hereinafter.

Briefly, the present invention is directed to a composition suitable for processing into a stretch wrap film comprising from approximately 79% to 98% by weight of a high molecular weight ethylene-vinyl acetate copolymer, from approximately 1% to 18% by weight of a polypropylene copolymer and from approximately 0.3% to 5% by weight of a tackifier agent selected from the group consisting of glycerol mono fatty acids, sorbitan mono fatty acids, castor oil and epoxidized soya, said ethylene-vinyl acetate copolymer having a vinyl acetate comonomer content of between approximately 8% and 20% and said polypropylene copolymer having a refractive index substantially similar to that of the ethylene-vinyl acetate copolymer.

The invention also relates to films prepared from such compositions.

DESCRIPTION OF THE PREFERRED EMBODIMENTS

In accordance with the present invention, it has now been found that an improved stretch pallet wrapping film material may be produced from a blend composition comprised of from approximately 79% to 98% by weight of a high molecular weight ethylene-vinyl acetate copolymer, from approximately 1% to 18% by weight of a polypropylene copolymer and from 0.3% to 5% by weight of certain tackifier agents as described hereinafter. It has been found that this particular combination of components provides stretch pallet wrap film materials having improved characteristics.

As indicated, the major component of the blend composition from which the novel stretch pallet wrap film materials of the present invention are produced is a high molecular weight ethylene-vinyl acetate copolymer. Recently, high molecular weight ethylene-vinyl acetate copolymers have become commercially available. A principal example of such a material is that marketed under the trade designation "DuPont 3135" by E. I. DuPont de Nemours & Co. This copolymer has a vinyl acetate comonomer content of approximately 12% and has a high molecular weight as evidenced by its melt index of 0.25. While this material constitutes a vast improvement over previously known ethylene-vinyl acetate copolymers, it is also deficient in normal usage tensile strength (less than 100% machine direction elongation), modulus of elasticity, resistance to transverse tear under machine direction tension and likewise it is not easily producible in extremely thin gauges. However, when combined with the polypropylene copolymer and tackifier agents specifically described below, the resulting combination produces the desired properties for a stretch wrap pallet film material.

It will be understood that high molecular weight ethylene-vinyl acetate copolymers having a vinyl acetate comonomer content of from approximately 8% to 20% and a melt index range of from approximately 0.1 to 2 (indicative of a high molecular weight) are generally useful in the practice of the invention.

The addition of the polypropylene copolymer to the ethylene-vinyl acetate copolymer, in accordance with the invention, provides a stretch pallet wrap film with equivalent holding power at less than 100% elongation in considerably thinner gauges when compared with the same unmodified ethylene-vinyl acetate copolymer as a result of the higher modulus of elasticity. It also provides increased resistance to transverse wear under machine direction tension. A major improvement resides in processability. The combination of the ethylene-vinyl acetate copolymer and the polypropylene copolymer can be drawn to much thinner gauges with trouble-free production than is possible with currently available unmodified ethylene-vinyl acetate copolymer by itself.

Within the meaning of this invention, the polypropylene copolymer is one in which the propylene component is present in an amount between approximately 94% and 99.5% and the ethylene component is present in an amount between approximately 0.5% and 6%. An example of a useful polypropylene copolymer is that marketed under the trade designation "Diamond Shamrock 9670". It is a copolymer of approximately 97% propylene and 3% ethylene. It will be understood that other such copolymers are also useful in the practice of the invention. An important consideration for the polypropylene copolymer is that it have a refractive index (e.g., 1.46/1.47) substantially similar to that of the ethylene-vinyl acetate copolymer component. This means that the optical properties of the two components are substantially equivalent which is desirable for the properties of the film materials of the invention. It is to be further noted that the polypropylene copolymer and ethylene-vinyl acetate copolymer components should be chemically compatible or of a similar chemical nature and that their viscosities should be compatible so that little mixing is needed to blend them. In the present invention, both of these materials have comparable viscosities at the processing conditions involved (380° F. at approximately 500 reciprocal seconds shear rate).

While the addition of the polypropylene copolymer produces certain beneficial results, at the same time it decreases the layer to layer tackiness of the resulting film which is a definite disadvantage. In accordance with the present invention, it has been found that the addition of certain tackifier agents overcomes this problem. Thus, I have found that the incorporation of glycerol mono fatty acids, sorbitan mono fatty acids, castor oil or epoxidized soya effectively overcomes the problem while the use of other tackifier agents such as microwax, polyterpene or sodium stearate does not. The useful tackifier agents appear to be partially incompatible with the copolymer blend and thus bloom to the surface providing a tacky surface with little or no adverse effect on the bulk properties of the film. Among the glycerol mono fatty acids useful in the practice of the invention are glycerol monooleate, glycerol monostearate, glycerol monolaurate and glycerol monopalmitate. Similarly, useful sorbitan mono fatty acids include sorbitan monolaurate, sorbitan monopalmitate, sorbitan monostearate and sorbitan monooleate. It will be understood that other glycerol mono fatty acids and sorbitan mono fatty acids may also be employed in the practice of the invention. Also useful as tackifier agents are epoxidized soya such as that marketed under the trade designation "Drapex 6.8" and castor oil such as that marketed by NL Industries.

In general, the useful range of the three component blend composition from which the novel film materials are prepared has been found to be between approximately 79% and 98% by weight ethylene-vinyl acetate copolymer between approximately 1% and 18% by weight of the polypropylene copolymer and between 0.3% and 5% by weight of the tackifier agent. The preferred range for the tackifier agent is between approximately 1% and 3%. The preferred tackifier agent is glycerol monooleate (such as that marketed by Armour Chemical under the trade designation "Armak GMO 810") and the preferred formulation of the invention is 90% by weight ethylene-vinyl acetate copolymer, 8% by weight polypropylene copolymer and 2% by weight glycerol monooleate.

In preparing the blend compositions of the invention, the ethylene-vinyl acetate copolymer and polypropylene copolymer are obtained in pellet form and dry tumble blended prior to pouring into the hopper of an extruder. Then the tackifier agent is added to the dry resins by one of several methods.

A concentrate containing the tackifier agent (e.g., 10%) and the ethylene-vinyl acetate copolymer (e.g., 90%) is made by melting the ethylene-vinyl acetate copolymer and masticating in a double arm mixer. The tackifier agent is measured and poured into the mixer and mixed until a homogeneous blend is obtained. This blend is then forced through multiple ⅛" diameter parts or dies to form strands which are then cooled in a water bath and chopped into pellets using a suitable chopper. This concentrate can then be dry tumbled with the ethylene-vinyl acetate copolymer and the polypropylene copolymer.

Alternatively, the tackifier agent may be simply tumble blended with the ethylene-vinyl acetate copolymer and the polypropylene copolymer, the tackifier agent in liquid form merely wetting the surfaces of the dry resin pellets. This blend is then fed to the hopper of the extruder.

In still another alternative, the tackifier agent in liquid form may be added directly to the extruder by use of a metering pump to control the flow rate of the tackifier agent. The tube from the metering pump is positioned in the hopper containing the dry blended polypropylene copolymer and ethylene-vinyl acetate copolymer such that its outlet is near the extruder screw. The flow rate of the tackifier agent is timed to the extrusion rate of the ethylene-vinyl acetate copolymer/polypropylene copolymer blend to yield the proper percent by weight.

The properties and characteristics exhibited by the novel films of the invention are illustrated by the test results presented below.

The following examples illustrate the practice of the invention:

EXAMPLE 1

A concentrate containing 10% glycerol monooleate (GMO) and 90% higher molecular weight ethylene-vinyl acetate copolymer (EVA) was prepared by melting the EVA and masticating in a double arm mixer. The EVA had a vinyl acetate comonomer content of 12%. The liquid GMO was measured and poured into the mixer and mixed until a homogeneous blend was obtained. The blend was then forced through multiple ⅛ inch diameter ports or dies to form strands which were then cooled in a water bath and chopped into pellets.

The concentrate so produced was dry blended with EVA and a polypropylene copolymer in the following proportions:
  72% EVA
  8% polypropylene copolymer
  20% of the concentrate
This yielded a final blend composition of:
  90% EVA
  8% polypropylene copolymer

2% GMO

To produce film by the blown film process, this dry blend was fed to the hopper of a 4½" diameter single screw extruder having a 24 to 1 L/D single stage-screw connected to a 12 inch spiral rotating die having a 0.027 inch die gap. Depending upon the width of film to be made, the blow up ratio is from 1.6:1 to 2.5:1. The extruder was run with the temperature of the barrel and die set at 430° F. and feed zone screw cooling was employed. The line speed was approximately 125 ft./min. The film produced was 0.0008 inch thick and was wound into 20 inch wide rolls 3,000 ft. in length. Each roll weighed 20 lbs. giving a film area yield of 36,000 sq. inches per lb. of film. By contrast a roll of 0.0008 inch thick by 20 inch wide by 3,000 lineal feet polyvinyl chloride stretch pallet wrap film weighs 26 lbs. giving a film yield of only 27,700 sq. in./lb.

The film produced was used to stretch wrap a 4×4×4 foot pallet load of bags each containing 50 lbs. of plastic resin pellets. The pallet wrap machine employed was one marketed under the trade designation "Sidewinder" by Infra Pak Corp., Dallas, Tex. In wrapping the pallet, the film was stretched an average of 25%. 8 completed wraps were made, 2 convolute wraps on the bottom, 2 spiral wraps up the pallet, 2 convolute wraps on the top and 2 spiral wraps down the pallet. Approximately 100 ft. of film was used weighing ⅔ of a lb. By contrast the same pallet wrapped with the above-mentioned polyvinyl chloride film would require 0.83 lbs., nearly 25% more.

EXAMPLE 2

Example 1 was repeated in producing film from a blend composition of:
97 parts EVA
3 parts polypropylene copolymer
1 part blend of sorbitan monolaurate, sorbitan monopalmitate, sorbitan monostearate and sorbitan monooleate (marketed under the trade designation "Atmer 645" by ICI America)

EXAMPLE 3

Example 1 was repeated in producing film from a blend composition of:
92 parts EVA
8 parts polypropylene copolymer
1 part blend of sorbitan monolaurate, sorbitan monopalmitate, sorbitan monostearate and sorbitan monooleate (marketed under the trade designation "Atmer 645" by ICI America)

EXAMPLE 4

Example 1 was repeated in producing film from a blend composition of:
85 parts EVA
15 parts polypropylene copolymer
2.7 parts blend of sorbitan monolaurate, sorbitan monopalmitate, sorbitan monostearate and sorbitan monooleate (marketed under the trade designation "Atmer 645" by ICI America)

EXAMPLE 5

Example 1 was repeated in producing film from a blend composition of:
75 parts EVA
25 parts polypropylene copolymer
2 parts blend of sorbitan monolaurate, sorbitan monopalmitate, sorbitan monostearate and sorbitan monooleate (marketed under the trade designation "Atmer 645" by ICI America)

EXAMPLE 6

Example 1 was repeated in producing film from a blend composition of:
96% EVA
3% polypropylene copolymer
1% glycerol monooleate

EXAMPLE 7

Example 1 was repeated in producing film from a blend composition of:
91% EVA
8% polypropylene copolymer
1% glycerol monooleate

EXAMPLE 8

Example 1 was repeated in producing film from a blend composition of:
81% EVA
18% polypropylene copolymer
1% glycerol monooleate

EXAMPLE 9

Example 1 was repeated in producing film from a blend composition of:
95% EVA
3% polypropylene copolymer
2% glycerol monooleate

EXAMPLE 10

Example 1 was repeated in producing film from a blend composition of:
80% EVA
18% polypropylene copolymer
2% glycerol monooleate

EXAMPLE 11

Example 1 was repeated in producing film from a blend composition of:
89% EVA
8% polypropylene copolymer
3% glycerol monooleate

EXAMPLE 12

Example 1 was repeated in producing film from a blend composition of:
90% EVA
8% polypropylene copolymer
2% epoxidized soya (marketed under the trade designation "Drapex 6.8")

EXAMPLE 13

Example 1 was repeated in producing film from a blend composition of:
90% EVA
8% polypropylene copolymer
2% castor oil In the foregoing examples, the EVA employed was that marketed by duPont under the trade designation "DuPont 3135" and the polypropylene copolymer employed was that marketed by Diamond Shamrock under the trade designation "Diamond Shamrock 9670".

Each of the films produced in accordance with Examples 1–13 were subjected to certain tests to determine their physical characteristics and properties. The results are set forth in Table 1 along with the corresponding results for a film produced from 100% EVA and a film produced from a blend of 95% EVA and 5% polypropylene copolymer. The ASTM test methods employed are also set forth in Table 1 except for the Lap Shear, Stress Relaxation and Cut Growth tests which were carried out as described below.

Lap Shear Test

Two film samples 1 inch wide by 6 to 8 inches long are cut from the stretch pallet wrap material with the long dimensions corresponding to the machine direction of the film. The end portions of the two samples are overlapped with their edges aligned. A one lb. weight, 1" sq. is placed on the overlapped film samples for one minute such that the films are forced together by a force of 1 lb. over an area of 1 sq. in. The free end of each sample is then clamped, 1 end in each jaw of an Instron Tensile Testing Machine with the overlapped portions between the jaws, the jaws separated 2" (2" gage length) and such that the force applied to the overlap area is a shear mode as opposed to a peal mode. The sample is pulled to failure at a jaw separation rate of 20" per minute, recording the ultimate lbs. force and ultimate elongation. Failure is when the two samples separate completely in the overlap area.

Stress Relaxation at 30% Elongation

A 1" width of the stretch pallet wrap material is tested according to an adaptation of the ASTM Standard Method of Test for the Elastic Properties of Textile Fibers #D1774-72. The test results are plotted on a chart with the horizontal coordinate representing the strain (inches of stretch of the test specimen per inch length of the specimen) and the vertical coordinate representing the lbs. of stress in the test specimen at the various amounts of strain. In performing the test, the test specimen (which has a total length of about 5") is clamped in the jaws of the testing machine with the jaws 2" apart so that the effective length of the specimen under test is 2". Then the jaws are relatively extended to stretch the specimen at the rate of 20" per minute until the specimen has been stretched 30%. The stress in the specimen at 30% stretch is then determined from the chart. The specimen is held at 30% stretch for 1 min., 5 min., 10 min. and 16 hours and the stress relaxation values recorded on the chart. The stress retention characteristics of the sample material is the ratio of the length of the line on the chart which represents the stresses obtained in the specimen after the 1 min., 5 min., 10 min., or 16 hours relaxation periods, respectively, to the length of the line on the chart which represents the stress in the specimen at 30% stretch before the relaxation period.

Cut Growth

A three inch wide sample eight to ten inches long is cut from the material with the long dimension the machine direction of the material. This sample is clamped in the jaws of an Instron Tensile Testing Machine and elongated at a cross head spread of 1 in./min. to 50% elongation. The test is conducted by slitting the film in the cross machine direction $1\frac{1}{2}$" wide centered between the jaws and centered across the sample width. One minute after the cut is made, the width is measured and the data reported as percent growth, i.e., $$\frac{\text{measured length}}{1\frac{1}{2}} - 1\frac{1}{2} \times 100.$$

The slitting of the samples is made at three increments of time from elongation to slitting; immediately, 1 min. and 5 min. In all cases, measurements are taken 1 min. after slitting.

TABLE 1

| TEST METHOD | Exam. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | 100% EVA | 95% EVA/5% polypropylene copolymer |
|---|---|---|---|---|---|---|---|---|---|---|---|---|---|---|---|
| Gauge Mil (ASTM D-374) | | | | | | | .81 | | | | | | | .89 | .90 |
| Tensile Ultimate (psi) (ASTM D-882) MD | | | | | | | 5,990 | | | | | | | 3,690 | 4,560 |
| TD | | | | | | | 5,240 | | | | | | | 4,840 | 4,720 |
| Elongation Ultimate (%) (ASTM D-882) MD | | | | | | | 490 | | | | | | | 330 | 330 |
| TD | | | | | | | 670 | | | | | | | 670 | 630 |
| Modulus (psi × 10³) (ASTM D-882) | 16,500 | 11,200 | 17,500 | 24,000 | 40,800 | 12,400 | 16,800 | 26,300 | 11,800 | 21,000 | 14,600 | 15,700 | 15,500 | 9,800 | 12,800 |
| Tear Resistance (gm.) (ASTM D-1922) MD | | | | | | | 48 | | | | | | | 74 | |
| TD | | | | | | | 96 | | | | | | | 106 | |
| Puncture Propagation of Tear (lb. tear) MD | | | | | | | 5.83 | | | | | | | 5.96 | |
| TD | | | | | | | 6.09 | | | | | | | 6.16 | |
| Gloss (%) (ASTM D-2582) | | | | | | | 74 | | | | | | | 74 | 61 |
| Haze (%) (ASTM D-2457) | | | | | | | 1.0 | | | | | | | 2.1 | 4.4 |
| Total Transmittance (%) (ASTM D-1003) | | | | | | | 91.9 | | | | | | | 92.1 | |
| Lap Shear (psi) | 1.1 | .9 | .9 | 1.1 | 1.0 | 1.1 | 1.1 | 1.1 | 1.2 | 1.1 | 1.3 | 1.6 | 1.5 | 1.2 | .51 |
| Stress Relaxation (% of original/psi after 16 hrs.) | 51.8/.58 | 58.2/.53 | 57.6/.55 | 58.5/.72 | 60.2/.92 | 60.1/.55 | 55.1/.61 | 54.9/.66 | 53.6/.55 | 48.2/.82 | 50.6/.58 | 57.4/.78 | 49.4/.78 | 66.1/.48 | 63.0/ |
| Cut Growth (%) 0 min. | 100 | 100 | — | — | — | 100 | 100 | 100 | 100 | — | — | 100 | 100 | 100 | |
| 2 min. | 8.4 | 54.2 | — | — | — | 25.1 | 11.2 | 6.8 | 12.8 | — | — | 13.4 | 6.1 | 100 | |
| 5 min. | 11.0 | 12.5 | — | — | — | 6.2 | 6.8 | 4.7 | 5.8 | — | — | 6.1 | 5.2 | 32.5 | |

In view of the above, it will be seen that the several objects of the invention are achieved and other advantageous results attained.

As various changes could be made in the above products without departing from the scope of the invention, it is intended that all matter contained in the above description shall be interpreted as illustrative and not in a limiting sense.

What is claimed is:

1. A composition suitable for processing into a stretch wrap film comprising from approximately 79% to 98% by weight of a high molecular weight ethylene-vinyl acetate copolymer, from approximately 1% to 18% by weight of a polypropylene copolymer and from approximately 0.3% to 5% by weight of a tackifier agent selected from the group consisting of glycerol mono fatty acids, sorbitan mono fatty acids, castor oil and epoxidized soya, said ethylene-vinyl acetate copolymer having a vinyl acetate comonomer content of between approximately 8% and 20% and a melt index of between approximately 0.1 and 2 and said polypropylene copolymer being a copolymer of approximately 94% to 99.5% propylene and approximately 0.5% to 6% ethylene and having a refractive index substantially similar to that of the ethylene-vinyl acetate copolymer.

2. A composition as set forth in claim 1 wherein the high molecular weight ethylene-vinyl acetate copolymer has a melt index of approximately 0.25.

3. A composition as set forth in claim 1 wherein the tackifier agent is present in an amount between approximately 1% and 3% by weight.

4. A composition as set forth in claim 1 wherein the glycerol mono fatty acid is glycerol monooleate, glycerol monostearate, glycerol monolaurate or glycerol monopalmitate.

5. A composition as set forth in claim 4 wherein the glycerol mono fatty acid is glycerol monooleate.

6. A composition as set forth in claim 5 wherein the glycerol monooleate is present in an amount of approximately 2% by weight.

7. A composition as set forth in claim 1 wherein the ethylene-vinyl acetate copolymer has a vinyl acetate comonomer content of approximately 12%.

8. A composition as set forth in claim 1 wherein the ethylene-vinyl acetate copolymer is present in an amount of approximately 90% by weight.

9. A composition as set forth in claim 1 wherein the polypropylene copolymer is present in an amount of approximately 8% by weight.

10. A composition as set forth in claim 1 wherein the tackifier agent is selected from the group consisting of glycerol monostearate, glycerol monooleate, sorbitan monolaurate, sorbitan monopalmitate, sorbitan monostearate and sorbitan monooleate.

11. A composition suitable for processing into a stretch wrap film comprising approximately 90% by weight of an ethylene-vinyl acetate copolymer having a vinyl acetate comonomer content of approximately 12% and a melt index of between approximately 0.1 and 2, approximately 8% by weight of a polypropylene copolymer and of approximately 94% to 99.5% propylene and approximately 0.5% to 6% ethylene and approximately 2% by weight of glycerol monooleate.

12. A film prepared from a composition comprising from approximately 79% to 98% by weight of a high molecular weight ethylene-vinyl acetate copolymer, from approximately 1% to 18% by weight of a polypropylene copolymer and from approximately 0.3% to 5% by weight of a tackifier agent selected from the group consisting of glycerol mono fatty acids, sorbitan mono fatty acids, castor oil and epoxidized soya, said ethylene-vinyl acetate copolymer having a vinyl acetate comonomer content of between approximately 8% and 20% and a melt index of between approximately 0.1 and 2 and said polypropylene copolymer being a copolymer of approximately 94% to 95% propylene and approximately 0.5% to 6% ethylene and having a refractive index substantially similar to that of the ethylene-vinyl acetate copolymer.

13. A film according to claim 12 wherein the high molecular weight ethylene-vinyl acetate copolymer has a melt index of approximately 0.25.

14. A film according to claim 12 wherein the tackifier agent is present in an amount between approximately 1% and 3% by weight.

15. A film according to claim 12 wherein the glycerol mono fatty acid is glycerol monooleate, glycerol monostearate, glycerol monolaurate or glycerol monopalmitate.

16. A film according to claim 15 wherein the glycerol mono fatty acid is glycerol monooleate.

17. A film according to claim 16 wherein the glycerol monooleate is present in an amount of approximately 2% by weight.

18. A film according to claim 12 wherein the ethylene-vinyl acetate copolymer has a vinyl acetate comonomer content of approximately 12%.

19. A film prepared according to claim 12 wherein the ethylene-vinyl acetate copolymer is present in an amount of approximately 90% by weight.

20. A film prepared according to claim 12 wherein the polypropylene copolymer is present in an amount of approximately 8% by weight.

21. A film prepared according to claim 12 wherein the tackifier agent is selected from the group consisting of glycerol monostearate, glycerol monooleate, sorbitan monolaurate, sorbitan monopalmitate, sorbitan monostearate and sorbitan monooleate.

22. A film prepared from a composition comprising approximately 90% by weight of an ethylene-vinyl acetate copolymer having a vinyl acetate comonomer content of approximately 12% and a melt index of between approximately 0.1 and 2, approximately 8% by weight of a polypropylene copolymer of approximately 94% to 99.5% propylene and approximately 0.5% to 6% ethylene and approximately 2% by weight of glycerol monooleate.

* * * * *